United States Patent [19]
Fan

[11] Patent Number: 5,877,723
[45] Date of Patent: Mar. 2, 1999

[54] SYSTEM AND METHOD FOR DETERMINING AN OPERATING POINT

[75] Inventor: Zhejun Fan, Dunlap, Ill.

[73] Assignee: Caterpillar Inc., Peoria, Ill.

[21] Appl. No.: 810,798

[22] Filed: Mar. 5, 1997

[51] Int. Cl.[6] ................................. G01S 5/02
[52] U.S. Cl. ......................... 342/357; 701/216
[58] Field of Search .................. 342/357, 457; 701/213, 220, 216

[56] References Cited

U.S. PATENT DOCUMENTS

| | | | |
|---|---|---|---|
| 4,754,280 | 6/1988 | Brown et al. | 342/357 |
| 5,030,958 | 7/1991 | Schmalenberger | 342/358 |
| 5,325,302 | 6/1994 | Izidon et al. | 364/461 |
| 5,390,125 | 2/1995 | Sennott et al. | 364/449 |
| 5,402,340 | 3/1995 | White et al. | 364/420 |
| 5,416,712 | 5/1995 | Geier et al. | 342/357 |
| 5,504,482 | 4/1996 | Schreder | 340/995 |
| 5,543,804 | 8/1996 | Buchler et al. | 342/357 |
| 5,563,786 | 10/1996 | Torii | 364/424.02 |
| 5,583,774 | 12/1996 | Diesel | 364/443 |
| 5,606,506 | 2/1997 | Kyrtsos | 364/449.1 |
| 5,654,890 | 8/1997 | Nicosia et al. | 364/428 |
| 5,657,025 | 8/1997 | Ebner et al. | 342/357 |

FOREIGN PATENT DOCUMENTS

| | | | |
|---|---|---|---|
| 522862A1 | 7/1972 | European Pat. Off. | G01S 5/02 |
| 0453726A2 | 2/1991 | European Pat. Off. | G01S 5/14 |
| 0519630A2 | 6/1992 | European Pat. Off. | G01C 21/20 |
| 0629877A1 | 6/1994 | European Pat. Off. | G01S 5/14 |
| 2254511A | 3/1992 | United Kingdom | G01S 5/02 |
| 2280077A | 7/1994 | United Kingdom | G01S 5/14 |

OTHER PUBLICATIONS

Brockstein, A.J. "GPS–Kalman–Augmented Inertial Navigation System Performance", NAECON, 1976; Proceedings of the National Aerospace and Electronics Conference, Dayton, Ohio, May 18–20, 1976, pp. 864–871.

Kao et al. "Multiconfiguration Kalman Filter Design for High Performance GPS Navigation", IEEETransactions on Automatic Control, vol. AC-28, No. 3, Mar. 1983, pp. 304–314.

*Primary Examiner*—Gregory C. Issing
*Attorney, Agent, or Firm*—James R. Yee; David M. Masterson; Steven D. Lundquist

[57] ABSTRACT

System and method for determining an operating point of a mobile machine. The invention receives GPS information from a GPS and INU information from an inertial navigational unit. A plurality of error states are modeled. The operating point of the mobile machine is determined as a function of the error states and the GPS and INU information.

9 Claims, 3 Drawing Sheets

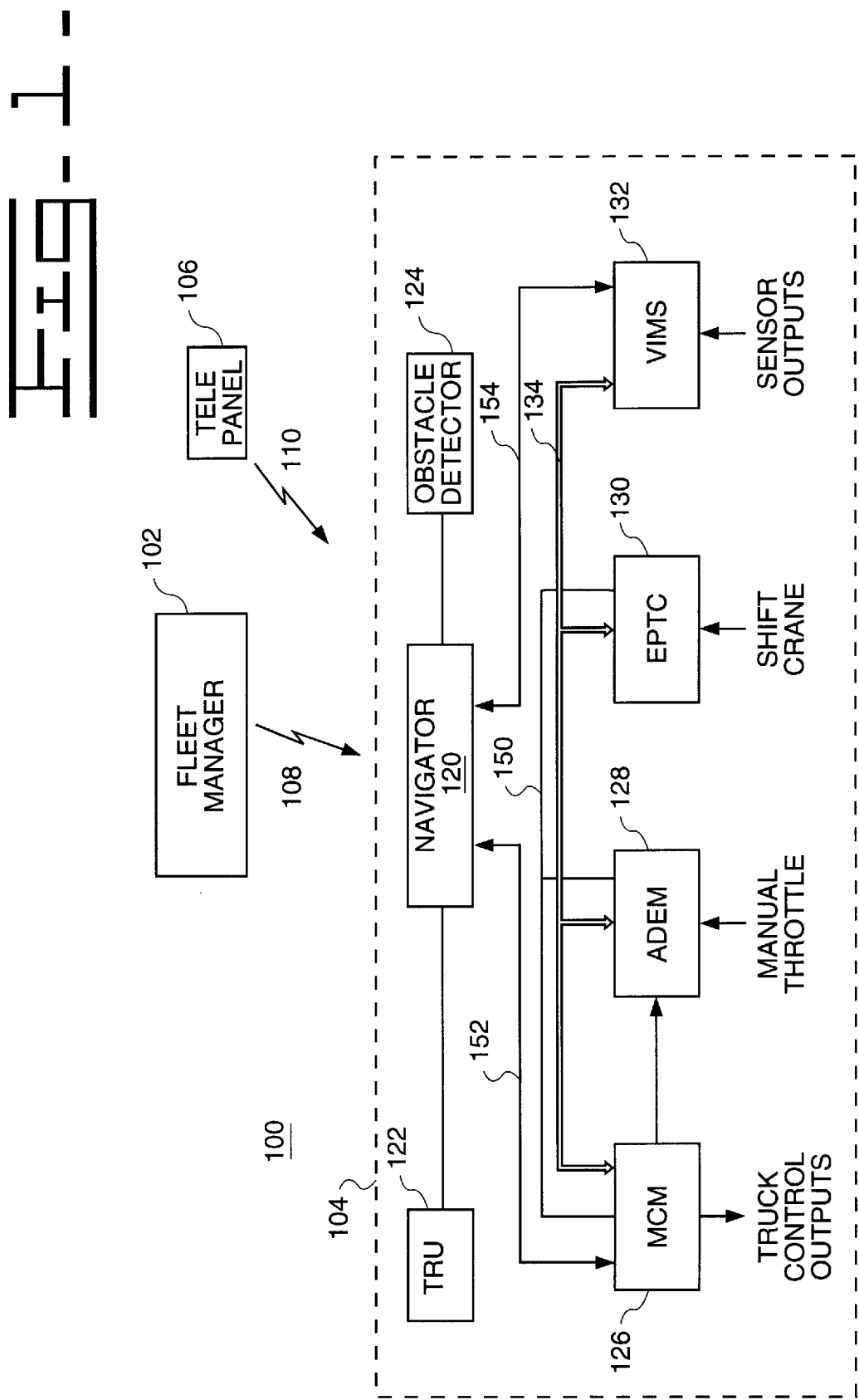

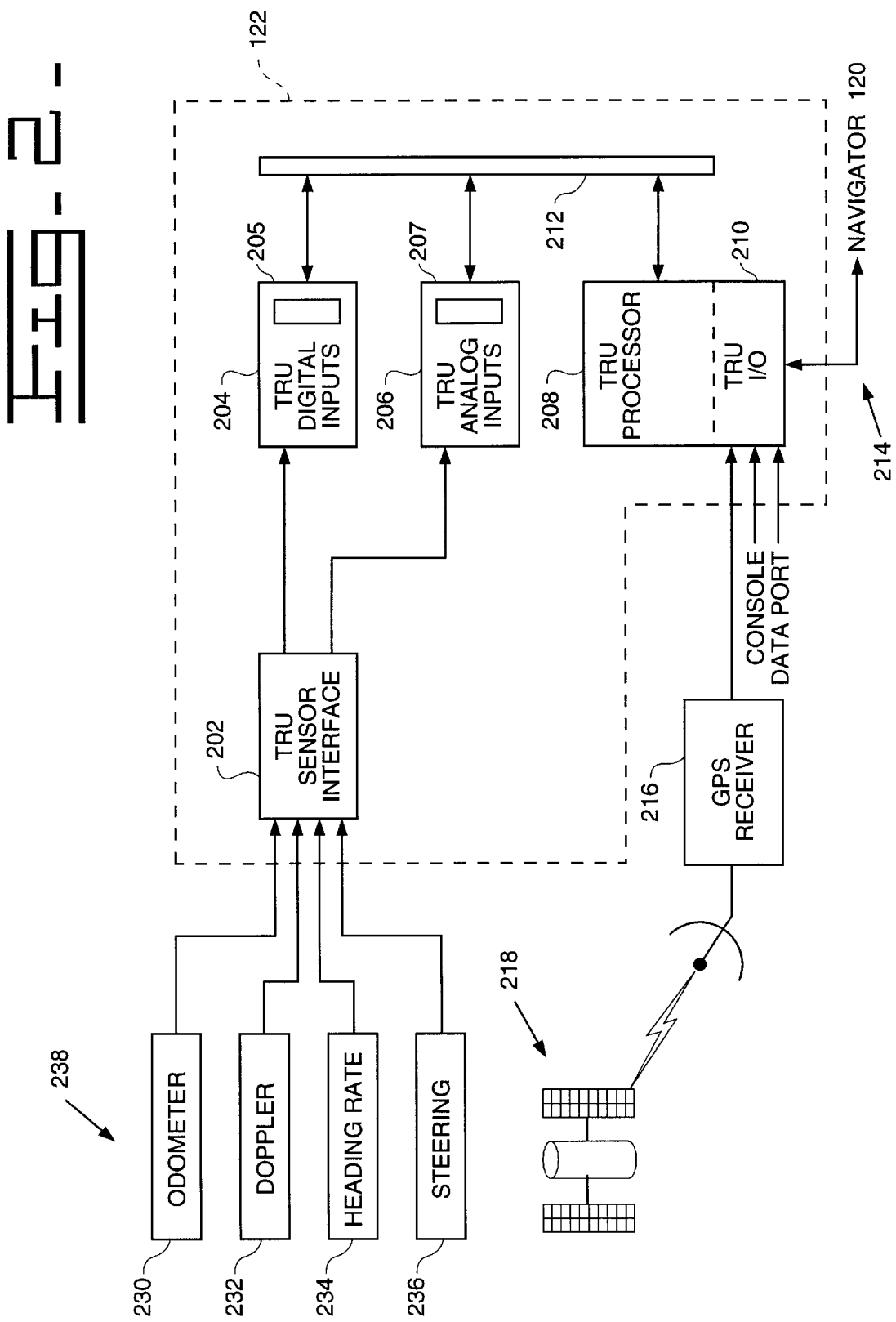

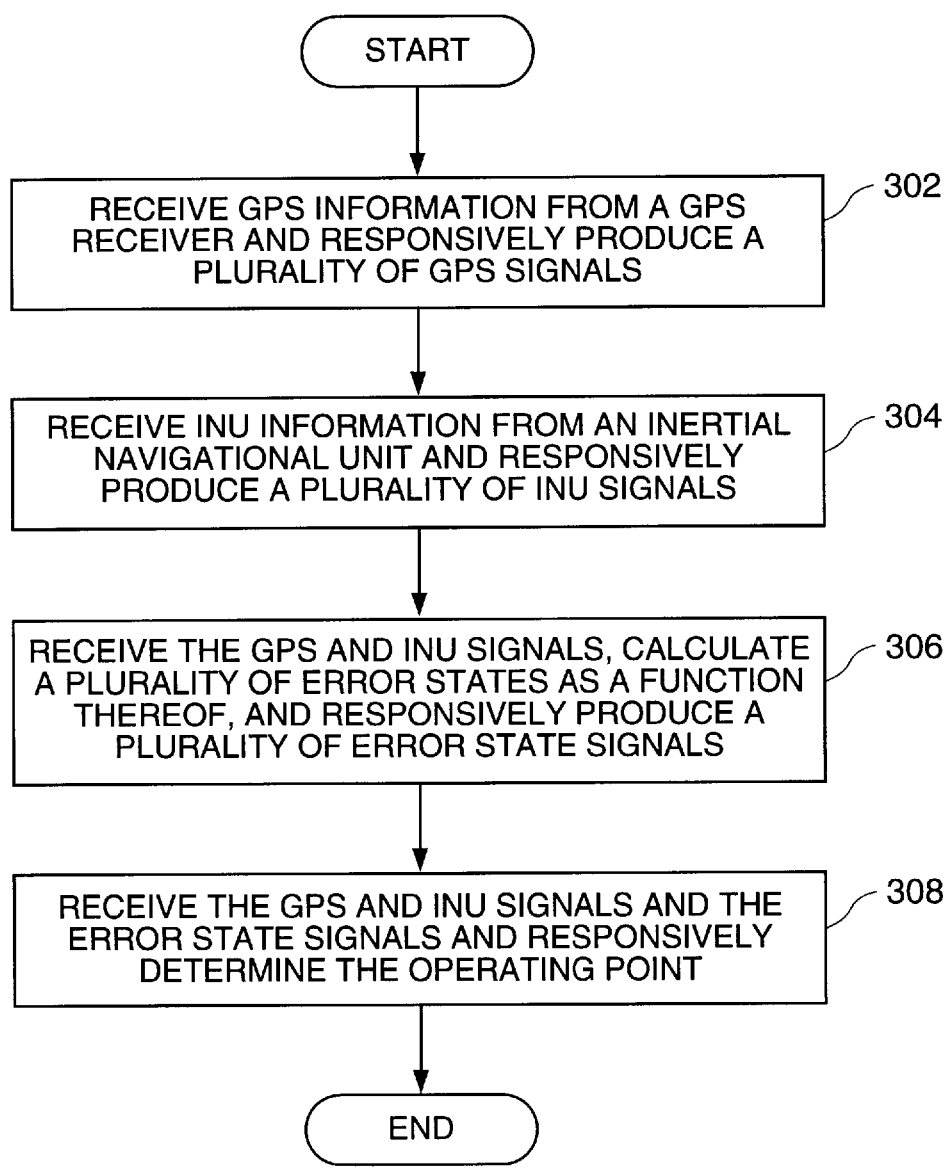

SYSTEM AND METHOD FOR DETERMINING AN OPERATING POINT

TECHNICAL FIELD

The present invention relates generally to the control of autonomous machines and, more particularly, to a system and method for providing on optimally coupled GPS and inertial navigation unit.

BACKGROUND ART

Improvements in positioning systems are making autonomous machines, such as autonomous earthmoving machines a reality.

In order to achieve autonomy, a machine must at all times be able to determine it position relative to its environment. One system commonly used to achieve this goal is the Global Positioning System or GPS. The GPS consists of a plurality of satellites which transmit electromagnetic signals. A GPS receiver located within the range of the satellites receives signals from the satellites and determines the position of the receiver using triangulation methods.

However, there are numerous occasions where GPS is not accurate or usable. For example, the signals from the GPS satellites may be blocked by obstructions or the accuracy of the GPS receiver determined position may be decreased by other causes.

It is possible to use a GPS receiver alone for positioning. However, when high accuracy is required, integrated positioning systems are preferred. An integrated positioning system uses measurements from several different types of sensors to achieve highly accurate positioning information.

Many examples of integrated positioning systems are known. Such integrated systems use GPS navigation signals as well as measurements from inertial and other machine motion type sensors to produce more accurate position estimates. However, these systems are generally of custom design and are therefore expensive and burdensome to implement.

One such system is disclosed in U.S. Pat. No. 5,390,125, granted Feb. 14, 1995, "Machine Position Determination System and Method". The system disclosed in the '125 patent determines machine position using a machine positioning system (VPS). The VPS determines an accurate estimate of machine position by performing a weighted average of a first position estimate and a second position estimate. The first position estimate is received from a global positioning system (GPS) receiver. The second position estimate is received from an inertial navigation unit (INU). The first and second position estimates are weighted as a function of their predicted accuracy to produce a more accurate third position estimate. Such a system as that disclosed in the '125 patent tends to be very expensive.

Other systems combine signals from the GPS receiver and the INU using a Kalman filter. These systems are generally of two types: a loosely coupled system or a tightly coupled system.

The loosely coupled system is the simplest. These systems assume that the GPS data is accurate. Generally, they have a minimum number of states or inputs into the Kalman filter, e.g., GPS North, GPS East, GPS velocity north, GPS velocity east, INU North, INU East, INU velocity north, INU velocity east, and INU heading rate. However, a loosely coupled system is less accurate than a tightly coupled system.

The tightly coupled system does not assume that position data, as determined by the GPS is accurate. Rather, it uses the raw data from the GPS receiver and combines it with data from the INU. Thus, the number of required Kalman filter states increases dramatically. This results in greater complexity and added cost.

The present invention is directed at one or more of the problems as set forth above.

DISCLOSURE OF THE INVENTION

In one aspect of the present invention, a method for determining an operating point of a mobile machine, is provided. The method includes the steps of receiving GPS information from a GPS receiver and responsively producing a plurality of GPS signals, receiving INU information from an inertial navigational unit and responsively producing a plurality of INU signals, and receiving the GPS and INU signals, calculating a plurality of error states as a function thereof, and responsively producing a plurality of error state signals. The method further includes the step of receiving the GPS and INU signals and the error state signals and responsively determining the operating point.

In another aspect of the present invention, a system for determining an operating point for a mobile machine is provided. The system includes a receiver, mounted on the machine, for receiving navigation signals from a satellite-based positioning system and for responsively producing a plurality of receiver signals and an inertial navigation unit for measuring at least one dynamic parameter of the machine and responsively producing a plurality of INU signals. The system includes a truck reference unit for receiving the receiver and INU signals, calculating a plurality of error states as a function thereof, responsively producing a plurality of error state signals, and determining an operating point of the mobile machine as a function of the receiver and INU signals and the error state signals.

BRIEF DESCRIPTION OF THE DRAWINGS

FIG. 1 is a high level block diagram showing the autonomous machine system of the invention;

FIG. 2 is a block diagram illustrating the structure of the truck reference unit of the invention; and, FIG. 3 is a flow chart illustrating the operation of the present invention.

BEST MODE FOR CARRYING OUT THE INVENTION

With reference to FIG. 1, the present invention provides a method and system for determining the position of an operating point on a machine. The operating point is some predetermined fixed point located somewhere on the machine. The term "operating point" refers to a dynamic machine position and attitude. The dynamic parameters describing a machine's dynamic position and attitude may include, for example, position, velocity, acceleration, heading, pitch, roll, speed, heading rate, pitch rate, and roll rate.

In the preferred embodiment, operating point includes north position, east position, speed, heading, and heading rate. For purposes of illustration, the invention is described in the environment of an autonomous machine system 100. This is done for purposes of illustration only. A person skilled in the art will recognize that the invention may be used in other applications.

FIG. 1 is a high level block diagram showing an autonomous machine system 100. The autonomous machine system 100 includes a fleet manager 102, a machine control system 104, and a tele-operation panel 106. The fleet manager 102 is configured to manage a fleet of autonomous mining machines such as dump trucks. The fleet manager 102 acts like a foreman, assigning tasks to the mining machines and tracking their progress as they perform these tasks. The fleet manager 102 communicates with each machine via a radio link 108. Each machine includes an on-board machine control system 104. The machine control system 104 permits autonomous operation of the mining machine under the control of fleet manager 102. The machine control system 104 includes a navigator 120, a truck reference unit (TRU) 122, an obstacle detector 124, a machine control module (MCM) 126, an advanced diesel engine manager (ADEM) 128, an electronic programmable transmission control (EPTC) 130, and a vital information management system (VIMS) 132.

The navigator 120 receives instructions from the fleet manager 102 via radio link 108. The instructions include, for example, a work assignment or task. From the task, navigator 120 determines a route to be followed. The route may be, for example, a haul segment between an excavation site and a crusher site in an open pit mining operation.

The TRU 122 determines the operating point of the machine based on measurements determined from a satellite based positioning system and onboard sensors. Based on the machine's operating point and the desired route, the navigator 120 generates a desired steering angle and a desired speed for the machine. The obstacle detector 124 is a radar unit which scans the area in front of the machine for obstacles. When obstacle detector 124 detects an obstacle, it provides an indication that an obstacle is detected and/or the location of the obstacle to navigator 120. The navigator 120 may then stop the machine or navigate around the obstacle.

The tele-operation panel 106 may be used to communicate, via radio signals as indicated at 110, steer angle, speed and other commands directly to the navigator 120 to allow remote control operation of the machine.

The Navigator 120, TRU 122 and obstacle detector 124 represent onboard intelligence for the machine which allows autonomous control commands to be generated in the form of the speed and steering angle commands. The Navigator 120 produces speed and steering angle commands based on a desired route of travel and the machine's operating point. The navigator 120 computes the adjustments of the present steering angle and speed based on the current operating point to move the machine along the desired route. The fleet manager 102 provides the navigator 120 with the desired route. The TRU 122 provides navigator 120 with the operating point of the autonomous machine.

A block diagram illustrating the structure of TRU 122 is shown in FIG. 2. In the preferred embodiment, the TRU 122 includes a TRU sensor interface 202, a TRU digital input card 204, a TRU analog input card 206, a TRU processor 208, a TRU serial interface 210, and a TRU databus 212.

Sensor interface 202 receives signals from the inertial navigation unit (INU) 238. The INU 238 includes a bidirectional odometer 230, a Doppler ground speed indicator 232, a solid-state heading rate sensor 234, and a steering resolver 236. Bidirectional odometer 230 measures the distance the vehicle travels and the direction, i.e. forward or reverse. Doppler ground speed indicator 232 measures the speed the vehicle is traveling. Solid-state heading rate sensor 234 measures the rate at which the vehicle is changing heading or turning. Steering resolver 236 measures the steering angle of the vehicle. One skilled in the art would recognize that various other sensors could be used to measure the same parameters. For example, a tachometer could be used to measure speed, or a gyroscope could be used to measure heading rate.

Furthermore, measurements could be taken from additional or different sensors and incorporated into the invention in an attempt to gain additional accuracy. For example, an inclinometer could be used to measure angle of ascent, a pitch rate sensor could be used to measure the rate of change of ascent, or a compass could by used to measure heading. On the other hand, some sensors could be eliminated in an effort to save costs at the expense of some loss in accuracy.

The sensor measurements are collected by sensor interface 202. Sensor interface 202 passes digital signals, i.e. timing strobes, pulse-width modulated signals, etc., to digital input card 204, and analog signals, i.e. voltages, currents, etc., to analog input card 206. Digital input card 204 converts the digital timing and pulse signals to digital values and stores them in a digital register 205. Analog input card 206 scales and converts the analog signals to digital values and stores them in an analog register 207. The TRU processor 208, a general purpose microprocessor, accesses digital register 205 or analog register 207 via databus 212 to obtain the sensor measurements.

TRU 122 receives position data from a satellite-based positioning system 218. In the preferred embodiment, the satellite-based positioning system 218 is the Global Positioning System (GPS). A GPS receiver 216 receives satellite signals from satellite-based positioning system 218 and determines its own position based on these signals. In the preferred embodiment, GPS receiver 216 is differential GPS receiver MX 9212 commercially available from Magnavox Electronic Systems Company, Torrance, Calif. GPS receiver 216 provides TRU 122 with receiver determined measurements including north position, east position, north velocity, and east velocity as well as timing information. TRU 122 receives the measurements from GPS receiver 216 via serial interface 210. The TRU processor 208 receives the GPS receiver measurements from serial interface 210. With the GPS receiver determined measurements and the sensor measurements obtained above, the TRU processor 208 computes an estimate of the operating point of the autonomous vehicle. The TRU processor 208 passes the operating point to the serial interface 210 which in turn sends the operating point to navigator 120 over serial data line 214.

The remaining description requires a brief introduction to Kalman filtering. In general, a Kalman filter is an optimal linear least-means-squared estimator. In the preferred embodiment, an extended Kalman filter is used. An extended Kalman filter uses a linearized model based on the current state of a non-linear system to compute least-means-squared estimates. While the discussion uses "Kalman filter" and "Kalman filtering", it applies equally well to "extended Kalman filter" and "extended Kalman filtering". Kalman filtering is well known in the art and is therefore not further discussed.

With reference to FIG. 3, a method for determining an operating point of a mobile machine, according to an embodiment of the present invention will now be discussed.

In a first control block 302, GPS information is received from the GPS receiver and responsively producing a plurality of GPS signals. In the preferred embodiment, the plurality of GPS signals include:

GPS NORTH;
GPS EAST;
GPS VELOCITY NORTH; and
GPS VELOCITY EAST.

These GPS signals are also states within the Kalman filter.

In a second control block 304, INU information is received from the inertial navigational unit and responsively a plurality of INU signals are produced. In the preferred embodiment, the plurality of INU signals are used to update INU states within the Kalman filter. The INU states include:

INU NORTH;
INU EAST;
INU VELOCITY;
INU VELOCITY HEADING; and
INU HEADING RATE.

In a third control block 306, the GPS and INU signals are received, a plurality of error states as a function thereof are calculated and a plurality of error state signals are responsively produced.

In the fourth control block 308, the GPS and INU signals and the error state signals are received and the operating point is responsively determined.

In the preferred embodiment, the GPS and INU signals and the error state signals are inputs to the Kalman filter. The error state signals represent errors introduced by the INU and GPS systems.

In the preferred embodiment, the error states include:

BIAS RATE;
RAW GPS—NORTH BIAS; and
RAW GPS—E BIAS.

The error state BIAS RATE represents the difference between measured heading rate and estimated heading rate.

The error state RAW GPS—NORTH BIAS represents the difference between the measured GPS NORTH and estimated GPS NORTH.

The error state RAW GPS—E BIAS represents the difference between the measured GPS EAST and estimated GPS EAST.

It should be noted that other sensors can be modeled to achieve better accuracy without departing from the spirit of the invention.

In the preferred embodiment, the error states are modeled.

In one embodiment, each error state is modeled using an equation of the form:

$$x(t)=\Phi_1 X(t-1)+a(t)$$

where, x(t) represents the error state, t represents the current time, t−1 represents a previous time, a(t) represents noise, and $\Phi_1$ is a empirically derived constant.

In another embodiment, each error state is modeled using a second order equation of the form:

$$x(t)=\Phi_1 X(t-1)+\Phi_2 X(t-2)+a(t)-\Theta_1 a(t-1)$$

where, x(t) represents the error state, t represents the current time, t−1 and t−2 represent previous times, a(t) represents noise, and $\Phi_1$, $\Phi_2$ and $\Theta_1$ are empirically derived constants.

In still another embodiment, each error state is modeled by a higher order equation. The order of the equation is dependent upon the application.

INDUSTRIAL APPLICABILITY

With reference to the drawings and in operation, the present invention provides a method and system for determining an operating point of a mobile machine. Operating point is defined a dynamic machine position and attitude. The dynamic parameters describing a machine's dynamic position and attitude may include, for example, position, velocity, acceleration, heading, pitch, roll, speed, heading rate, pitch rate, and roll rate.

The present invention utilizes the Global Positioning System or GPS. A GPS receiver receives signals from the GPS satellites. An inertial navigation unit (INU) is also used to provide sensed information. GPS receiver provided information and INU provided information are combined using a Kalman filter to provide the operating point. Error states, i.e., errors introduced by the GPS and INU are modeled using GPS and INU provided information. The error states are also used by the Kalman filter to improve the accuracy of the determined operating point.

The present invention provides an optimally coupled GPS and INU system. The optimally coupled GPS and INU system combines the advantages of both loosely and highly coupled systems, i.e., high accuracy and low integration costs. Another advantage of this methodology is that processed noise and system coefficients are automatically estimated such that the noise is indeed white due to the sensor modeling features of the present invention.

Experimental results for GPS modeling are shown in Table One. Experimental results also indicate that system performance can be maintained for up to 30 seconds once GPS is lost.

TABLE ONE

GPS EXPERIMENTAL RESULTS

|  | Standard Deviation before Modeling | Standard Deviation after Modeling | Improvement |
|---|---|---|---|
| North | 0.578 | 0.0161 | 35.9 |
| East | 0.37 | 0.0127 | 29.0 |
| Height | 2.1825 | 0.0493 | 44.0 |

Other aspects, objects, and features of the present invention can be obtained from a study of the drawings, the disclosure, and the appended claims.

We claim:

1. A method for determining an operating point of a mobile machine, including the steps of:

receiving GPS information from a GPS receiver and responsively producing a plurality of GPS signals;

receiving INU information from an inertial navigational unit and responsively producing a plurality of INU signals;

receiving the GPS and INU signals, calculating a plurality of error states as a function thereof, and responsively producing a plurality of error state signals; and, receiving the GPS and INU signals and the error state signals and responsively determining the operating point.

2. A method, as set forth in claim 1, wherein the step of determining the operating point is accomplished using a Kalman filter.

3. A method, as set forth in claim 1, wherein the plurality of GPS signals include GPS NORTH, GPS EAST, GPS VELOCITY NORTH, and GPS VELOCITY EAST.

4. A method, as set forth in claim 1, wherein the plurality of INU signals are used to update Kalman filter states including INU NORTH, INU EAST, INU VELOCITY, INU HEADING, and INU HEADING RATE.

5. A method, as set forth in claim 1, wherein the error state signals include BIAS RATE, RAW GPS—NORTH BIAS, and RAW GPS—E BIAS.

6. A method, as set forth in claim 1, wherein the error state signals are determined using models.

7. A method, as set forth in claim 1, wherein each error state signal is modeled using an equation of the form $x(t)=\Phi_1 X(t-1)+a(t)$, where, $x(t)$ represents the error state, t represents the current time, t−1 represents a previous time, $a(t)$ represents noise, and $\Phi_1$ is a empirically derived constant.

8. A method, as set forth in claim 1, wherein each error state signal is modeled using an equation of the form $x(t)=\Phi_1 X(t-1)+\Phi_2 X(t-2)+a(t) -\Theta_1 a(t-1)$, where, $x(t)$ represents the error state, t represents the current time, t−1 and t−2 represent previous times, $a(t)$ represents noise, and $\Phi_1$, $\Phi_2$, and $\Theta_1$ are empirically derived constants.

9. A system for determining an operating point for a mobile machine, comprising:
- a receiver, mounted on the machine, for receiving navigation signals from a satellite-based positioning system and for responsively producing a plurality of receiver signals;
- an inertial navigation unit for measuring at least one dynamic parameter of the machine and responsively producing a plurality of INU signals;
- a truck reference unit for receiving the receiver and INU signals, calculating a plurality of error states as a function thereof, responsively producing a plurality of error state signals, and determining an operating point of the mobile machine as a function of the receiver and INU signals and the error state signals.

* * * * *